United States Patent [19]

Onuki

[11] Patent Number: 5,376,987
[45] Date of Patent: Dec. 27, 1994

[54] SPACE-EFFICIENT READER PRINTER APPARATUS

[75] Inventor: Kazuhiko Onuki, Tokyo, Japan

[73] Assignee: Canon Kabushiki Kaisha, Tokyo, Japan

[21] Appl. No.: 77,548

[22] Filed: Jun. 17, 1993

[30] Foreign Application Priority Data

Jul. 28, 1992 [JP] Japan .................................. 4-222181

[51] Int. Cl.⁵ .................................................. G03B 13/28
[52] U.S. Cl. ...................................... 355/45; 355/44
[58] Field of Search ................................. 355/44, 45

[56] References Cited

U.S. PATENT DOCUMENTS

| | | | |
|---|---|---|---|
| 4,873,552 | 10/1989 | Otsuki | 355/45 |
| 4,881,099 | 11/1989 | Onuki et al. | 355/45 |
| 5,028,128 | 7/1991 | Onuki | 353/122 |
| 5,160,958 | 11/1992 | Shirota | 355/45 |

*Primary Examiner*—Monroe H. Hayes
*Attorney, Agent, or Firm*—Fitzpatrick, Cella, Harper & Scinto

[57] ABSTRACT

In a reader printer, an upper unit for a printer is made to be rotatable toward an upper unit for a reader, both of which are provided on a lower machine box. The upper reader unit includes a screen for displaying an image. The upper unit for the printer rotates to enter a space in the upper reader unit behind the reflecting member closest to the screen so that a predetermined opening is provided between the lower machine box and the upper printer unit to expose the inside of the apparatus.

20 Claims, 6 Drawing Sheets

SPACE-EFFICIENT READER PRINTER APPARATUS

BACKGROUND OF THE INVENTION

1. Field of the Invention

This invention relates to a reader printer for microfilms.

2. Description of the Prior Art

Figure 6:
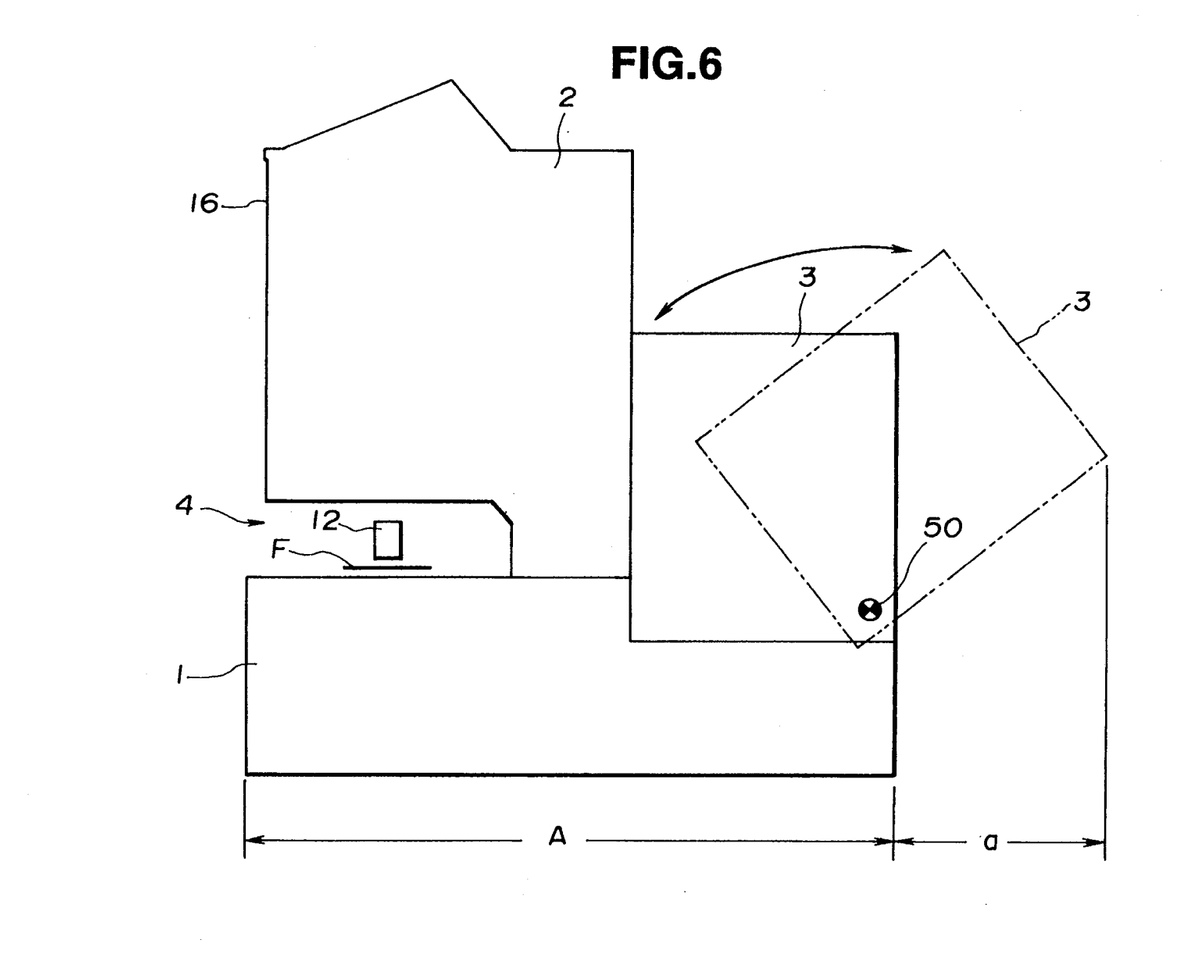
FIG. 6 is a diagram showing the schematic configuration of a conventional reader printer.

FIG. 6 illustrates the schematic configuration of a conventional reader printer.

In FIG. 6, reference numeral 1 represents a lower machine box of the reader printer (hereinafter termed the "apparatus"). Reader upper unit 2 of a reader unit and printer upper unit 3 of a printer unit (copying unit) are disposed at a front-side portion and a rear-side portion on lower machine box 1, respectively. Reader screen 16 is provided at the front side of upper unit 2. Upper unit 2 incorporates at least one reflecting member (reflecting mirror) and the like for providing a reader optical path. Upper unit 3 incorporates a copying mechanism.

Upper unit 2 is firmly fixed to lower machine box 1, and space portion 4 having an opening, at least at the front side of the apparatus, is formed between lower machine box 1 and upper unit 2. A microfiche carrier or a rolled-microfilm moving mechanism (not illustrated), projection lens 12 and the like are disposed in space portion 4. Microfilm F is set in the microfiche carrier or the rolled-microfilm moving mechanism.

Such a reader printer is configured such that the inside of the apparatus can be opened in order to perform, for example, jam recovery processing for copy paper, or repair or cleaning of the inside of the apparatus. In the apparatus shown in FIG. 6, printer upper unit 3 can be rotated, around rotation fulcrum (hinge shaft) 50 disposed at a rear lower portion of each side wall of the unit, from a closed state indicated by solid lines toward the rear side of the apparatus as indicated by two-dot chain lines. Thus, a wide opening is provided between the lower end of printer upper unit 3 and lower machine box 1 to cause the inside of lower machine box 1 to assume an opened state (an opened state of the apparatus). By rotating printer upper unit 3 in the reverse direction, printer upper unit 3 can be returned to the closed state, with respect to the apparatus, as indicated by the solid lines.

In the above-described conventional apparatus, however, in order to open the apparatus, printer upper unit 3 must be rotated around rotation fulcrum 50 disposed at the rear lower portion of each side wall of the unit toward the rear side of the apparatus. Hence, printer upper unit 3 further protrudes by an amount "a" to the rear side from the overall depth A of the apparatus, as indicated by the two-dot chain lines. As a result, if there is a wall or an object behind the rear side of the apparatus, the apparatus in some cases hits it. Thus, it is possible that thereby the apparatus cannot be sufficiently opened without being damaged. In order to prevent such accidents, a wasteful space must be reserved behind the apparatus.

SUMMARY OF THE INVENTION

It is an object of the present invention to provide a reader printer whose inside can be simply opened.

It is another object of the present invention to provide a reader printer in which a space provided for when the inside of the apparatus is opened is reduced.

It is still another object of the present invention to provide a reader printer which can be installed without providing a wasteful space around the apparatus.

According to one aspect, the present invention which achieves these objectives relates to a reader printer in which an upper unit of a printer unit on a lower machine box of the reader printer is rotated around a rotation fulcrum with respect to the lower machine box to provide an opening between the lower machine box and the printer upper unit of the printer unit to open the inside of the apparatus. The upper unit of the printer unit is rotatable toward an upper unit of a reader unit on the lower machine box. The upper unit of the printer unit is accommodated in a space behind the closest reflecting member to a reader screen on the reader optical path in the upper unit of the reader unit, and is moved while being rotated to provide the opening between the lower machine box and the upper unit of the printer unit to open the inside of the apparatus.

Another object of the present invention is to provide a reader printer including first optical means for projecting a film image onto a screen, second optical means for projecting the film image onto a photosensitive member, printing means for printing the image projected onto the photosensitive member, a first machine box for accommodating the first optical means and the printing means, a second machine box, provided so as to be movable with respect to the first machine box, for accommodating at least a part of the second optical means, and means for moving the second machine box between a closed position and an open position, with the second machine box entering the first machine box in the open position, wherein the inside of the first machine box is exposed when the second machine box is in the open position.

Still another object of the present invention is to provide a reader printer operable in a first mode in which a film image is illuminated by an illuminating means and projected onto a screen and a second mode in which the image is projected onto a photosensitive member to print the image. This objective is met by providing a reader printer including a base apparatus, in which the illuminating means and the screen are disposed, a printer unit, mounted on the base unit, in which at least the photosensitive member and one mirror for projecting the film image onto the photosensitive member are disposed, and means for rotating the printer unit between a first position in which the printer unit is outside the base apparatus and a second position in which the printer unit is at least partially inside the base apparatus.

A still further object of the present invention is to provide a reader printer including a lower machine box having front and rear portions which accommodates an illuminating system for illuminating a film image and a conveying means for conveying an image recording sheet, a reader machine box, disposed above the front portion of the lower machine box, which accommodates a screen and a first optical system for projecting the film image onto the screen, a printer machine box, disposed above the rear portion of the lower machine box, which accommodates a photosensitive member and at least a part of a second optical system which projects the film image onto the photosensitive member, and means for rotating the printer machine box from a closed position toward the reader machine box to an open position.

Yet another object of the present invention is to provide a reader printer having a projection lens for projecting a film image onto a screen via a reader optical path and a scanning member for performing scanning exposure of a surface of a photosensitive member via a printer optical path. The reader printer includes a base machine box which includes a screen, disposed at a front surface thereof, a reflecting member for projecting the film image from the projection lens onto the screen, an accommodating unit for accommodating image recording sheets, conveying means for feeding a sheet from the accommodating unit to a discharging unit via an image transfer position, and a movable member, disposed behind the screen, which is movable between an open position and a closed position, wherein the movable member supports the photosensitive member and the reflecting member for projecting the film image onto the photosensitive member, and wherein the movable member rotates from a closed position in a direction toward the front surface of the base machine box to an open position.

A still further object of the present invention is to provide a reader printer, having a read mode for displaying an image and a print mode for printing an image which includes, a lower machine box, having a front portion, a first optical means for projecting the image, and a rear portion. Also included in the reader printer is an upper reader unit, disposed above the front portion of the lower machine box, including second optical means for displaying the image projected by the first optical means when the printer is in the read mode, and an upper printer unit, disposed above the rear portion of the lower machine box, including printing means and third optical means which cooperate to print the image projected by the first optical means when the reader printer is in the print mode. The upper printer unit is rotatable from a closed position toward the front portion of the lower machine box to an open position. The second optical means includes a member for initially receiving and reflecting the image projected by the first optical means and a first reader reflecting member that is rotatable between a first position occupied when the reader printer is in the read mode and in which the first reader reflecting member intercepts the image reflected by the member, and a second position in which the reflected image is transmitted to the third optical means.

As described above, when the user intends to open the apparatus, by utilizing the space behind the closest reflecting member to the reader screen on the reader optical path in the upper unit of the reader unit, the upper unit of the printer unit is rotated toward the upper unit of the reader unit and is accommodated in the space behind the above-described reflecting member of the upper unit of the reader unit to provide the opening between the lower machine box and the upper unit of the printer unit to open the inside of the apparatus. Hence, the opened and rotated upper unit of the printer unit does not protrude outside the overall depth of the apparatus. Accordingly, wasteful space is not needed behind the apparatus.

DESCRIPTION OF THE PREFERRED EMBODIMENTS

Preferred embodiments of the present invention will now be described with reference to the drawings.

Figure 1:
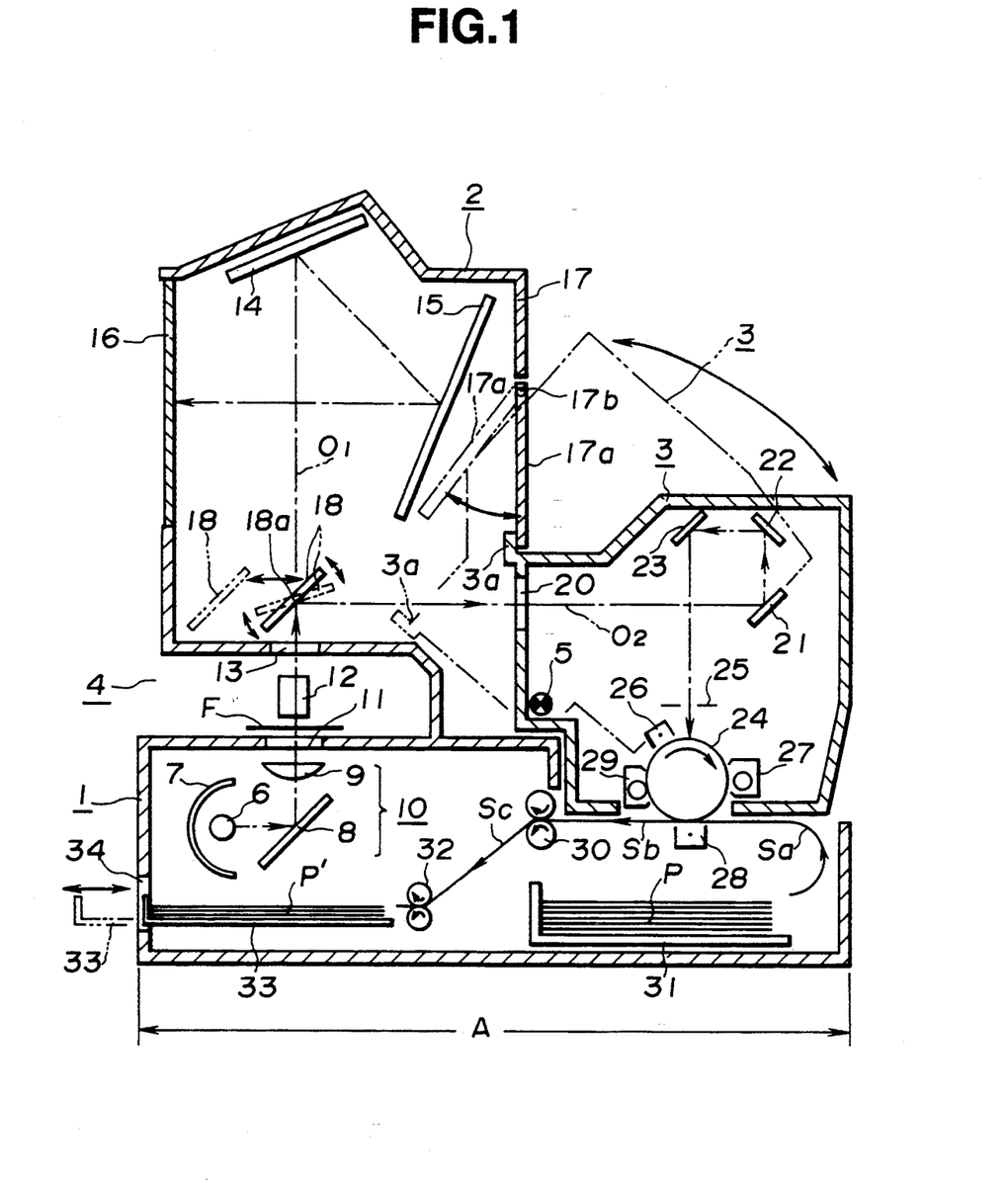
FIG. 1 is a diagram showing the schematic configuration of a reader printer according to a first embodiment of the present invention.
Figure 2:
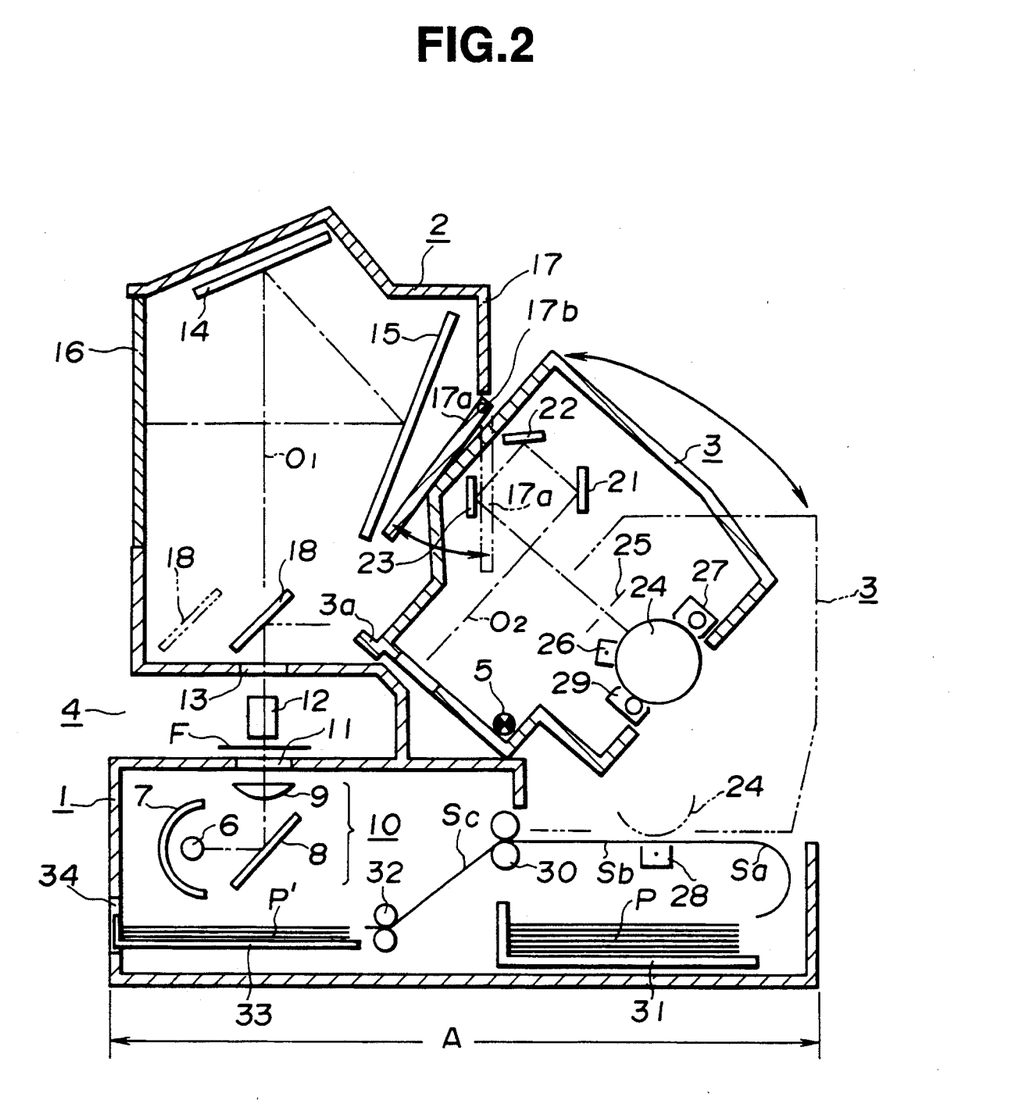
FIG. 2 is a diagram showing a state in which the inside of the apparatus shown in FIG. 1 is opened.

FIG. 1 is a diagram showing the schematic configuration of a reader printer according to a first embodiment of the present invention. FIG. 2 is a diagram showing a state in which the inside of the apparatus shown in FIG. 1 is opened.

As in FIG. 6 showing the above-described reader printer, in FIG. 1, there is a lower machine box 1, serving as a base machine box, upper unit 2 of a reader unit (together with the lower machine box serving as a first machine box), upper unit (second machine box) 3 of a printer unit, serving as an openable and closable member, and space portion 4 between the lower machine box and the upper unit of the reader unit.

Film-illuminating unit 10, comprising illuminating lamp 6, reflector 7, reflecting member (mirror) 8, condenser lens 9 and the like, sheet-discharging tray 33 provided below illuminating unit 10, and the like are disposed at a substantially front-side portion of the inside of lower machine box 1. Transfer charger 28, fixing unit 30, sheet-feeding cassette 31 and the like, constitute an image-forming process apparatus of a printer mechanism (e.g. a transfer-type electrophotographic copying mechanism in the present embodiment), and are disposed at a substantially rear-side portion of the inside of lower machine box 1.

Transparent screen (light-diffusing plate) unit 16 is disposed at the front surface of reader upper unit 2. First reader reflecting member 14 and second reader reflecting member 15 for forming a reader optical path are disposed by being fixed close to a ceiling portion and rear wall plate 17, respectively, with respective predetermined angles. Rotatable scanning reflecting member 18 for forming a printer optical path is disposed at the base-plate side within reader upper unit 2.

In a reader mode, rotatable scanning reflecting member 18 is moved and held at a retracted position indicated by two-dot chain lines away from the optical path from light-guiding aperture unit 13 formed at the base of reader upper unit 2 to first reader reflecting member 14. In a print mode, member 18 is moved and held at a position in the above-described optical path as indicated by solid lines.

First through third printer reflecting members 21–23 for forming the printer optical path are fixed at respective predetermined angles, and rotatable electrophotographic photosensitive drum 24, slit plate 25, charger 26, developing unit 27, cleaning unit 29 and the like constitute a process apparatus of the printer mechanism and are disposed within upper unit 3.

(a) In the read mode

As described above, in the read mode, scanning reflecting member 18 for the printer optical path is moved and held at the retracted position indicated by the two-dot chain lines.

Light from illuminating lamp 6 reaches illuminating aperture unit 11 provided at the upper surface of the lower machine box after passing through reflecting member 8 and condenser lens 9 to illuminate the image portion of the target frame of microfilm F situated at the position of illuminating aperture unit 11 from below. The illuminating light transmitted through the image of the frame enters upper unit 2 from below to above after passing through projection lens 12 and light-guiding aperture unit 13, and reaches the inner surface of screen 16 after passing along reader optical path $O_1$ via first reader reflecting member 14 and second reader reflecting member 15. The image of the target frame of microfilm F situated at the position of illuminating aperture unit 11 is projected onto the inner surface of screen 16 while being magnified, and is read from the side of the external surface of screen 16.

(b) In the print mode

When a print switch (not shown) is switched on while in the read mode, scanning reflecting member 18 for the printer optical path is moved to the position in the optical path indicated by the solid lines. At the same time, the printer mechanism is turned on, and the rotation of photosensitive drum 24, and the like are started. By the movement of scanning reflecting member 18 to the position in the optical path indicated by the solid lines, the light entering reader upper unit 2 from below to above from light-guiding aperture unit 13 after passing through projection lens 12 is reflected toward the rear side of the apparatus by scanning reflecting member 18, and enters printer upper unit 3 from communicating aperture unit 20 shared by upper units 2 and 3. The light then reaches the surface of photosensitive drum 24 after passing along printer optical path $O_2$ via first printer reflecting member 21, second printer reflecting member 22, third printer reflecting member 23 and slit plate 25.

Optical-image scanning is performed by rotating scanning reflecting member 18 around axis of rotation 18a at a predetermined angular velocity corresponding to the circumferential rotation speed of photosensitive drum 24. The enlarged image of the target frame of microfilm F is subjected to slit exposure on the surface of photosensitive drum 24 charged by charger 26, and an electrostatic latent image corresponding to the image of the target frame is formed on the surface of photosensitive drum 24.

The latent image is developed as a toner image by developing unit 27. The toner image is transferred onto the surface of transfer material P which has been individually separated and fed from sheet-feeding cassette 31 by the operation of sheet-feeding means (not shown), comprising sheet-feeding rollers or the like, and conveyed to the position of transfer charger 28 passing through sheet path Sa with the corresponding timing.

Transfer material P subjected to toner image transfer is conveyed to fixing unit 30 passing through sheet path Sb, and the transferred toner image is fixed in fixing unit 30. Transfer material P then passes through sheet path Sc, and is discharged onto tray 33 by sheet-discharging rollers 32 as an enlarged copy P' of the image of the target frame of microfilm F.

Transfer material P' on tray 33 can be taken out from aperture unit 34 provided at the front side of the lower machine box.

After toner image transfer onto transfer material P is performed, photosensitive drum 24 is cleaned by cleaning unit 29, and is repeatedly used for image formation.

The apparatus of the present embodiment is opened in the following manner. That is, by rotating printer upper unit 3, around rotation fulcrum 5 disposed at a lower front portion of each side wall of unit 3 as indicated by two-dot chain lines shown in FIG. 1 or by solid lines shown in FIG. 2, toward reader upper unit 2, printer upper unit 3 is accommodated in a space portion behind second reader reflecting member 15, serving as the closest reflecting member to screen 16 on the reader optical path in reader upper unit 2, while being inclined to open the space between lower machine box 1 and printer upper unit 3, and to cause the inside of lower machine box 1 to assume an opened state.

That is, a part 17a of rear wall plate 17 of reader upper unit 2 is rotatable around hinge shaft 17b provided at an upper portion of rear wall plate 17. When printer upper unit 3 is closed with respect to the apparatus (lower machine box 1) as indicated by the solid lines shown in FIG. 1, rotatable rear wall plate 17a hangs down by its own weight to close reader upper unit 2 as a dark box. Even if rotatable rear wall plate 17a is pushed toward the inside of reader upper unit 2 from behind while printer upper unit 3 is closed, rotation of rotatable rear wall plate 17a is hindered by projection 3a provided at an upper portion of printer upper unit 3.

In jam recovery processing, printer upper unit 3 is rotated around rotation fulcrum 5 in the direction of rear wall plate 17 of reader upper unit 2 using an operation lever (not shown). Printer upper unit 3 interferes with rotatable rear wall plate 17a in the course of the rotation. However, by further rotating printer upper unit 3, printer upper unit 3 pushes rotatable rear wall plate 17a to incline it while rotating it around hinge shaft 17b toward the inside of reader upper unit 2. Thus, printer upper unit 3 enters the space portion behind second reader reflecting member 15 of reader upper unit 2 to open the predetermined space between lower machine box 1 and printer upper unit 3, and to cause the inside of lower machine box 1 to assume an opened state, whereby sheet paths Sa and Sb are opened.

Printer upper unit 3 is held in the opened and rotated state, as indicated by the two-dot chain lines shown in FIG. 1 or the solid lines shown in FIG. 2, by anchoring means (not shown). Hence, the jammed transfer material can be easily removed from the inside of the opened lower machine box 1.

After jam recovery processing, the opened and anchored state of printer upper unit 3 is released, and printer upper unit 3 is rotated around rotation fulcrum 5 in the reverse direction and is returned to the closed state with respect to the apparatus indicated by the solid lines shown in FIG. 1. In accordance with the rotation of printer upper unit 3 in the reverse direction, rotatable rear wall plate 17a of reader upper unit 2 also returns to the original hung-down state by its own weight.

As described above, when the user intends to open the apparatus, by utilizing the space behind the closest reader reflecting member 15 to reader screen 16 on the reader optical path in reader upper unit 2, printer upper unit 3 for the printer is rotated toward reader upper unit 2 and is accommodated in the space behind reader reflecting member 15 of reader upper unit 2 to provide a predetermined space between lower machine box 1 and printer upper unit 3, and to open the inside of the apparatus. Hence, the opened and rotated printer upper unit 3 does not protrude outside the overall depth A of the apparatus. Accordingly, a wasteful space is not provided behind the apparatus.

Figure 3:
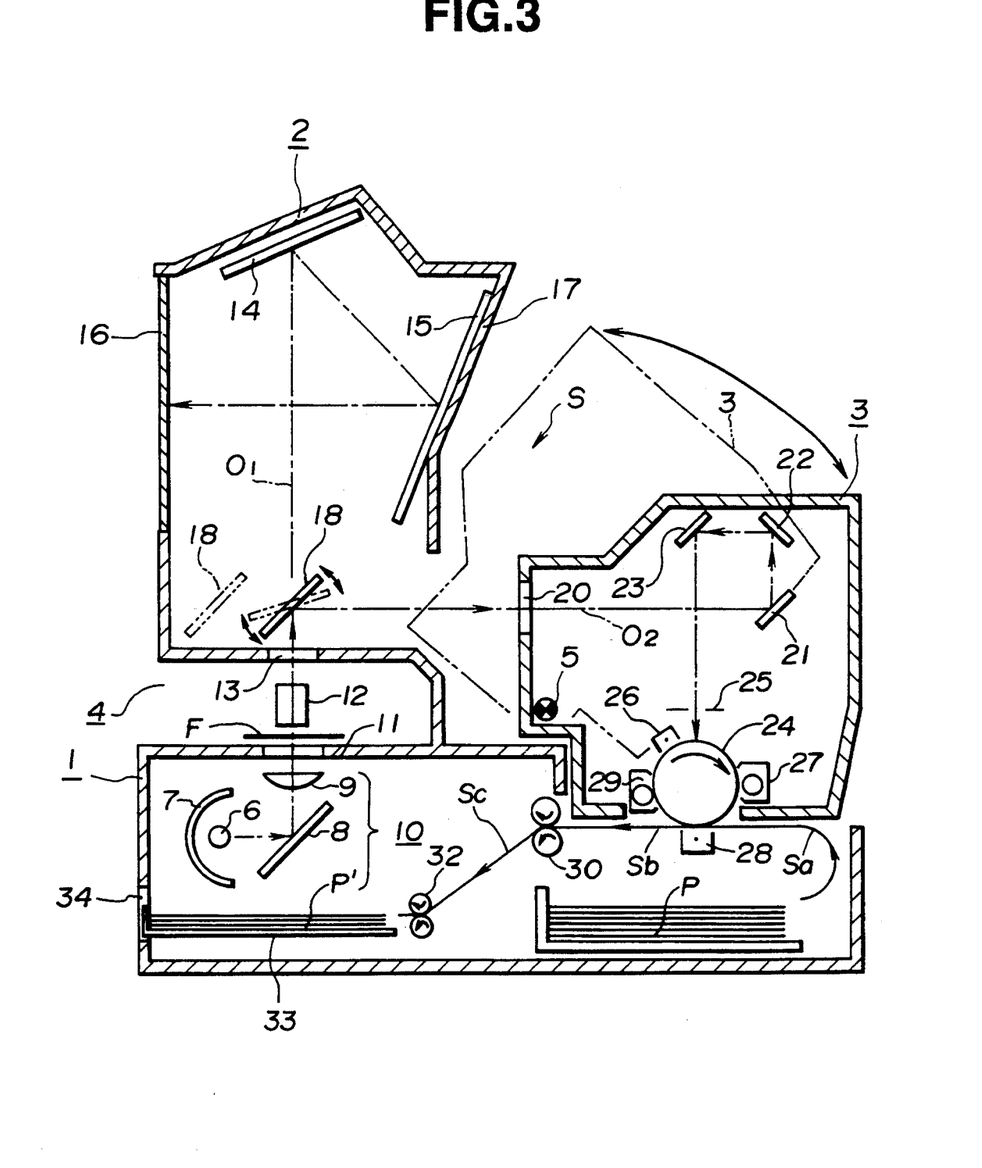
FIG. 3 is a diagram showing the schematic configuration of a reader printer according to a second embodiment of the present invention.

Next, a second embodiment of the present invention will be described with reference to FIG. 3.

The apparatus of the present embodiment differs from the above-described apparatus of the first embodiment in that rear wall plate 17 of reader upper unit 2 is depressed toward the inside of reader upper unit 2 so as to contact the back of second reader reflecting member 15 to provide an entrance space portion S for printer upper unit 3 when printer upper unit 3 is rotated around rotation fulcrum 5 by a predetermined angle between reader upper unit 2 and printer upper unit 3.

In the present embodiment, it is unnecessary to provide rear wall plate 17 with rotatable rear wall plate 17a as in the first embodiment. Hence, a simplified structure can be obtained.

Figure 4:
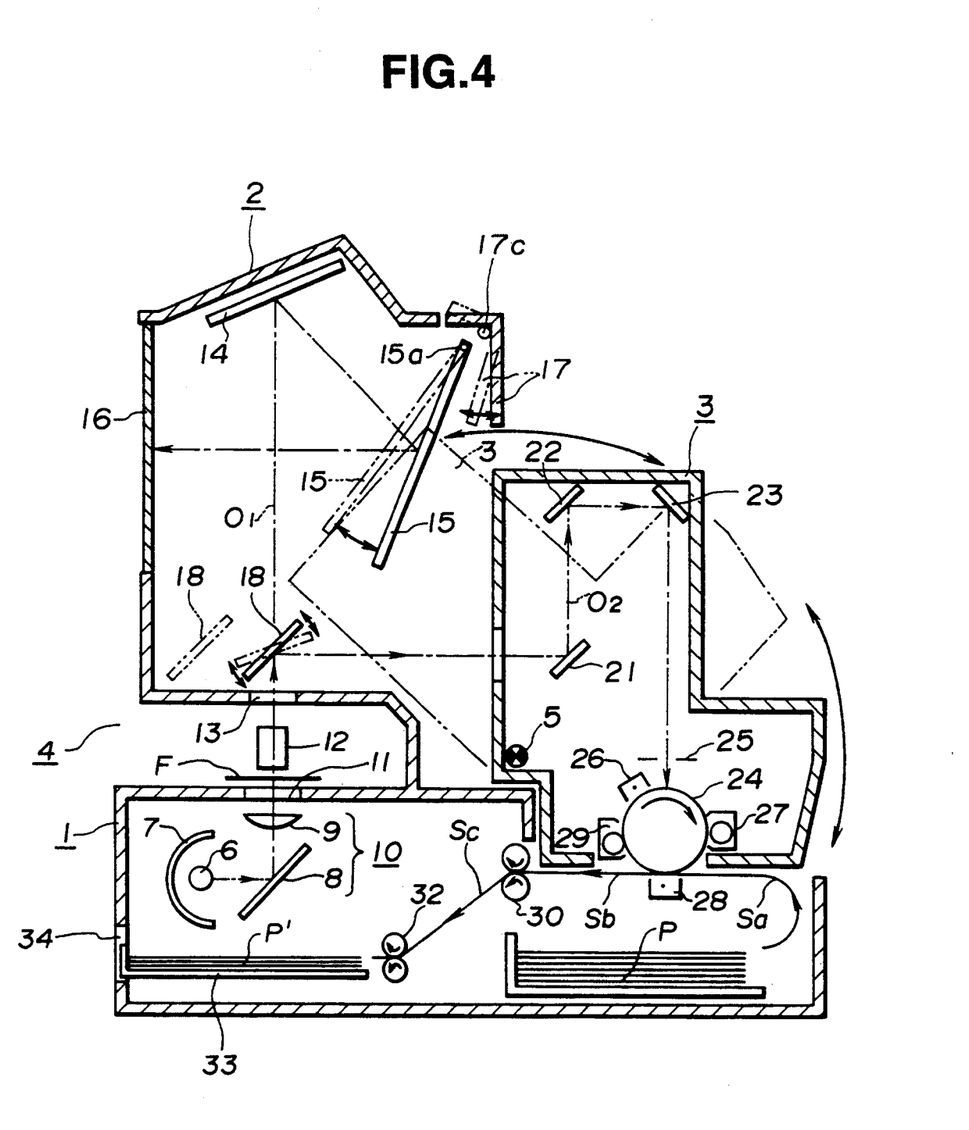
FIG. 4 is a diagram showing the schematic configuration of a reader printer according to a third embodiment of the present invention.

Next, a third embodiment of the present invention will be described with reference to FIG. 4.

In the apparatus of the present embodiment, first printer reflecting member 21 and second printer reflecting member 22 form printer optical path $O_2$ and are disposed at positions ahead of photosensitive drum 24 with respect to the front of the apparatus. Hence, the front portion of printer upper unit 3 for the printer is higher than the front portions of the above-described apparatus of the previous embodiments (shown in FIGS. 1, 2 and 3).

If this higher printer upper unit 3 is rotated around rotation fulcrum 5 toward reader upper unit 2 by a predetermined angle in order to open the apparatus, printer upper unit 3 interferes with rear wall plate 17 of reader upper unit 2 and the back of second reader reflecting member 15.

In order to solve such problems, in the present embodiment, rear wall plate 17 of reader upper unit 2 is arranged to be rotatable around rotation fulcrum 17c, and second reader reflecting member 15 is arranged to be rotatable around rotation fulcrum 15a provided at an upper portion of reader upper unit 2.

When printer upper unit 3 is closed with respect to the apparatus, as indicated by solid lines, rotatable rear wall plate 17 is in a hung-down state due to its own weight, as indicated by solid lines. Second reader reflecting member 15 is held by a stopper member (not shown) at a predetermined angular posture to regularly reflect light from first reflecting member 14 toward screen 16.

When printer upper unit 3 is rotated around rotation fulcrum 5 toward upper unit 2 by a predetermined angle in order to open the apparatus, rotatable rear wall plate 17 and second reflecting member 15 retract and rotate in response to the rotation of printer upper unit 3, as indicated by the two-dot chain lines, to allow printer upper unit 3 to rotate by a predetermined angle.

When printer upper unit 3 is rotated in the reverse direction, rotatable rear wall plate 17 and second reader reflecting member 15 also returns to its original state.

The above-described rotating and retracting operation of rotatable rear wall plate 17 and second reader reflecting member 15 may be linked with the rotation of printer upper unit 3 by a linking member, such as a link or the like. Rear wall plate 17 may be fixed under appropriate circumstances.

Figure 5:
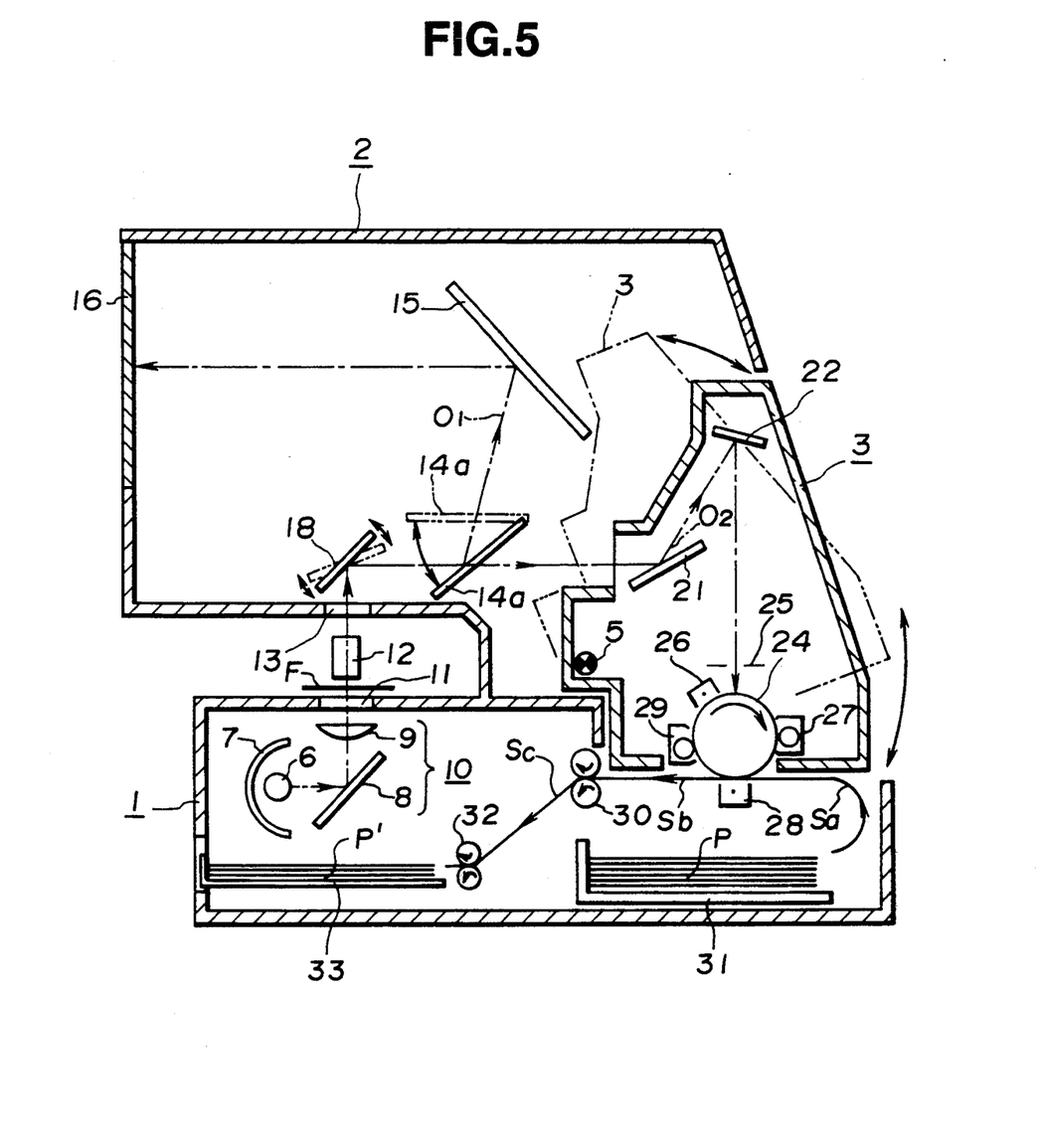
FIG. 5 is a diagram showing the schematic configuration of a reader printer according to a fourth embodiment of the present invention.

Next, a fourth embodiment of the present invention will be described with reference to FIG. 5.

In the present embodiment, scanning reflecting member 18 is disposed above light-guiding aperture unit 13 provided at the base of reader upper unit 2. In a read mode, scanning reflecting member 18 reflects light entering reader upper unit 2 via projection lens 12 and light-guiding aperture unit 13 from below to above toward the rear side of the inside of unit 2. The light then advances toward screen 16 via first reader reflecting member 14a, which has been switched to a position in the optical path indicated by solid lines, and second reflecting member 15.

In a print mode, first reader reflecting member 14a retracts from the optical path by being switched to a raised position as indicated by two-dot chain lines. Thus, light from scanning reflecting member 18 enters printer upper unit 3, and is incident upon photosensitive drum 24 via first printer reflecting member 21, second printer reflecting member 22 and slit plate 25. By the rotation of scanning reflecting member 18, the surface of photosensitive drum 24 is subjected to scanning exposure.

In the apparatus of the present embodiment, second reader reflecting member 15, which is the closest reflecting member to screen 16, is downwardly inclined. Even in such a system, as indicated by two-dot chain lines, printer upper unit 3 can enter a space behind second reader reflecting member 15 by being rotated around rotation fulcrum 5 by a predetermined angle toward reader upper unit 2 to provide a space between lower machine box 1 and printer upper unit 3, and to cause the inside of lower machine box 1 to assume an opened state.

In the optical system of the present embodiment, the number of reflecting members is reduced and therefore the production cost is reduced compared with the apparatus of the first through third embodiments. At the same time, providing the reader reflecting member (14) at the ceiling portion of the inside of reader upper unit 2 becomes unnecessary. Hence, the height of the apparatus can be reduced.

As described above, in each of the reader printers of the present invention, when the user intends to open the apparatus in order to perform jam recovery processing or the like, by utilizing a space behind the closest reflecting member to a reader screen on the reader optical path of an upper unit for a reader, an upper unit for a printer is rotated toward the reader upper unit and is accommodated in a space behind the above-described reflecting member of the reader upper unit to provide an opening between a lower machine box and the printer upper unit, thus opening the inside of the apparatus. Hence, the opened and rotated printer upper unit does not protrude outside the overall depth of the apparatus. Accordingly, a wasteful space is not provided behind the apparatus.

While the present invention has been described with respect to what is presently considered to be the preferred embodiments, it is to be understood that the invention is not limited to the disclosed embodiments. To the contrary, the present invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. a reader printer comprising:

first optical means for projecting a film image onto a screen;

second optical means for projecting the film image onto a photosensitive member;

printing means for printing the image projected onto the photosensitive member;

a first machine box for accommodating said first optical means and said printing means; and a second machine box, provided so as to be movable with respect to said first machine box, for accommodating at least a part of said second optical means, and means for moving said second machine box between a closed position and an open position, with said second machine box entering said first machine box in the open position, wherein the inside of said first machine box is exposed when said second machine box is in the open position.

2. A reader printer according to claim 1, wherein said printing means includes a path for conveying a sheet for printing the image, and wherein said path is exposed to the outside of said reader printer when said second machine box is in the open position.

3. A reader printer according to claim 1, wherein said first optical means comprises a mirror facing the screen, and wherein said second machine box is disposed behind said mirror.

4. A reader printer according to claim 3, wherein said moving means rotates said second machine box to enter a space formed behind said mirror within said first machine box when said second machine box is in the open state.

5. A reader printer according to claim 4, wherein said mirror moves in accordance with the rotation of said second machine box.

6. A reader printer according to claim 1, wherein said second optical means comprises a plurality of mirrors, and wherein said printing means comprises process means for forming the image on the photosensitive member, and wherein at least a part of said plurality of mirrors and the photosensitive member are disposed within said second machine box.

7. A reader printer according to claim 6, wherein said first machine box further comprises:

an accommodating unit for accommodating sheets to which images formed on the photosensitive member are transferred; and conveying means for conveying a sheet from said accommodating unit to a discharging unit via an image transfer position.

8. A reader printer according to claim 1, wherein said first machine box has an external wall portion which is movable between an open position and a closed position in accordance with the movement of said second machine box.

9. A reader printer according to claim 1, further comprising a screen disposed proximate front portion of said first machine box; and a mirror for directing light from the film image to said screen, said mirror disposed within said first machine box so as to face said screen, wherein said second machine box is disposed behind said mirror so that said second machine box approaches said mirror when moved toward the open position.

10. A reader printer operable in a first mode in which a film image is illuminated by an illuminating means and projected onto a screen and a second mode in which the image is projected onto a photosensitive member to print the image, said reader printer comprising:

a base apparatus in which the illuminating means and the screen are disposed; and a printer unit, mounted on said base apparatus, in which at least the photosensitive member and one mirror for projecting the film image onto the photosensitive member are disposed; and means for rotating said printer unit between a first position in which said printer unit is outside said base apparatus and a second position in which said printer unit is at least partially inside said base apparatus.

11. A reader printer according to claim 10, further comprising process means for printing the image which is projected onto the photosensitive member.

12. A reader printer according to claim 10, wherein said base apparatus further comprises a sheet-conveying path, and wherein said sheet-conveying path is exposed when said printer unit has rotated into said second position.

13. A reader printer comprising:

a lower machine box, having front and rear portions, which accommodates an illuminating system for illuminating a film image and a conveying means for conveying an image recording sheet;

a reader machine box, disposed above said front portion of said lower machine box, which accommodates a screen and a first optical system for projecting the film image onto the screen;

a printer machine box, disposed above said rear portion of said lower machine box, which accommodates a photosensitive member and at least a part of a second optical system, wherein said second optical system projects the film image onto the photosensitive member; and means for rotating said printer machine box from a closed position toward said reader machine box to an open position.

14. A reader printer according to claim 13, wherein said first optical system includes a mirror facing said screen, and wherein said printer machine box rotates so as to enter a space behind said mirror within said reader machine box.

15. A reader printer according to claim 14, wherein a sheet conveying path within said lower machine box is exposed when said printer machine box enters the space behind said mirror.

16. A reader printer according to claim 13, wherein said rotating means rotates said printer machine box in a direction so as to engage a movable external wall provided in said reader machine box, and wherein said external wall moves into said reader machine box in accordance with the rotation of said printer machine box to provide an opening between said printer machine box and said lower machine box.

17. A reader printer having a projection lens for projecting a film image onto a screen via a reader optical path and a scanning member for performing scanning exposure of a surface of a photosensitive member via a printer optical path, said reader printer comprising:

a base machine box, said base machine box including:

a screen disposed at a front surface thereof;

a reflecting member for projecting the film image from the projection lens onto said screen, an accommodating unit for accommodating image recording sheets, conveying means for feeding a sheet from said accommodating unit to a discharging unit via an image transfer position, and a movable member, disposed behind said screen, which is movable between an open position and a closed position, wherein said movable member supports the photosensitive member and said reflecting member for projecting the film image onto the photosensitive member, and wherein said movable member rotates from a closed position in a direction toward said front surface of said base machine box to an open position.

18. A reader printer having a read mode for displaying an image and a print mode for printing an image, said reader printer comprising:

a lower machine box having a front portion and a rear portion, said front portion including a first optical means for projecting said image;

an upper reader unit, disposed above said front portion of said lower machine box, including second optical means for displaying said image projected by said first optical means when said printer is in said read mode; and an upper printer unit, disposed above said rear portion of said lower machine box, including printing means and third optical means which cooperate to print said image projected by said first optical means when said reader printer is in said print mode, said upper printer unit being rotatable from a closed position toward said front portion of said lower machine box to an open position, wherein said second optical means includes a member for initially receiving and reflecting said image projected by said first optical means and a first reader reflecting member that is rotatable between a first position occupied when said reader printer is in said read mode in which said first reader reflecting member intercepts said image reflected by said member, and a second position in which said reflected image is transmitted to said third optical means.

19. A reader printer according to claim 18, wherein said third optical means consists of two reflecting members.

20. A reader printer according to claim 1, wherein a portion of said second optical means disposed within said second machine box is provided forward of said photosensitive member.

* * * * *